(12) United States Patent
Wang et al.

(10) Patent No.: US 8,180,513 B2
(45) Date of Patent: May 15, 2012

(54) AUTONOMOUS GROUND VEHICLE CONTROL SYSTEM FOR HIGH-SPEED AND SAFE OPERATION

(75) Inventors: Junmin Wang, Helotes, TX (US); Bapiraju Surampudi, San Antonio, TX (US); Joe Steiber, Spring Branch, TX (US)

(73) Assignee: Southwest Research Institute, San Antonio, TX (US)

( * ) Notice: Subject to any disclaimer, the term of this patent is extended or adjusted under 35 U.S.C. 154(b) by 615 days.

(21) Appl. No.: 12/115,010

(22) Filed: May 5, 2008

(65) Prior Publication Data

US 2009/0276111 A1     Nov. 5, 2009

(51) Int. Cl.
*G01C 22/00* (2006.01)

(52) U.S. Cl. .............................. 701/23; 701/41; 180/70

(58) Field of Classification Search .................... 701/23, 701/24, 41, 70, 72, 213, 215; 342/357.2, 342/357.36; 180/170
See application file for complete search history.

(56) References Cited

U.S. PATENT DOCUMENTS

| | | | | |
|---|---|---|---|---|
| 5,350,912 A | * | 9/1994 | Ishida | 250/202 |
| 5,924,512 A | * | 7/1999 | Wada | 180/253 |
| 6,141,617 A | * | 10/2000 | Matsuda et al. | 701/72 |
| 6,272,406 B2 | * | 8/2001 | Alofs et al. | 701/24 |
| 6,778,896 B1 | * | 8/2004 | Matsuura et al. | 701/70 |
| 6,901,319 B1 | | 5/2005 | Nelson et al. | |
| 7,142,956 B2 | * | 11/2006 | Heiniger et al. | 701/23 |
| 7,302,316 B2 | * | 11/2007 | Beard et al. | 701/11 |
| 7,400,956 B1 | * | 7/2008 | Feller et al. | 701/41 |
| 7,580,785 B2 | * | 8/2009 | Matsumoto et al. | 701/70 |
| 2002/0108805 A1 | * | 8/2002 | Card | 180/446 |
| 2003/0040849 A1 | * | 2/2003 | Hathout et al. | 701/1 |
| 2003/0149512 A1 | * | 8/2003 | Hrovat et al. | 701/1 |
| 2003/0225519 A1 | * | 12/2003 | Miyahara | 701/301 |
| 2005/0275284 A1 | * | 12/2005 | Katayama | 303/146 |
| 2006/0238201 A1 | * | 10/2006 | Brune et al. | 324/338 |
| 2006/0269387 A1 | * | 11/2006 | Yamaguchi | 414/729 |
| 2007/0179735 A1 | * | 8/2007 | Fiedler et al. | 702/150 |
| 2008/0269988 A1 | * | 10/2008 | Feller et al. | 701/41 |
| 2008/0294309 A1 | * | 11/2008 | Kaprielian et al. | 701/27 |
| 2009/0088974 A1 | * | 4/2009 | Yasan et al. | 701/213 |
| 2009/0192687 A1 | * | 7/2009 | Zagorski | 701/70 |
| 2010/0004798 A1 | * | 1/2010 | Bodin et al. | 701/2 |
| 2010/0017128 A1 | * | 1/2010 | Zeng | 701/301 |

OTHER PUBLICATIONS

Kanayama et al., "A Stable Tracking Control Method for an Autonomous Mobile Robot," 1990 IEEE International Conference on Robotics and Automation Proceedings May 13-18, 1990,,vol. 1, pp. 384-389.

Wang, et al., "Autonomous Ground Vehicle Control System for High Speed and Safe Operation," 2008 American Control Conference, Seattle, WA, Jun. 11-13, 2008, pp. 218-223.

* cited by examiner

*Primary Examiner* — Helal A Algahaim
(74) *Attorney, Agent, or Firm* — Grossman, Tucker et al

(57) ABSTRACT

The present disclosure relates to a reference yaw rate generator for an autonomous ground vehicle control system. The reference yaw rate generator is configured to generate a reference yaw rate ($r_r$) based on an actual latitudinal position (Y), a desired latitudinal position ($Y_d$), an actual longitudinal position (X), a desired longitudinal position ($X_d$) and an actual heading ($\psi$) of the autonomous ground vehicle.

19 Claims, 8 Drawing Sheets

AUTONOMOUS GROUND VEHICLE CONTROL SYSTEM FOR HIGH-SPEED AND SAFE OPERATION

FIELD OF THE INVENTION

This disclosure relates to a system and method for providing trajectory tracking for an autonomous ground vehicle. The system and method may enable the autonomous ground vehicle to operate safely at relatively high speeds.

BACKGROUND

Autonomous ground vehicles (AGV) may generally be required to track a trajectory (i.e., follow a route or path within some tolerance or error) without human intervention, i.e., without a human providing steering input to the AGV either on-board or remotely. The trajectory may be predefined and/or may be dynamically determined. The AGV may therefore include sensors that provide positional data, e.g., lateral and longitudinal position, heading and/or velocity. It may be desirable for the AGV to track the trajectory while maintaining a relatively high speed. At relatively high speeds, vehicle dynamics may affect vehicle stability and should, therefore, be considered by a trajectory tracking function.

SUMMARY

The present disclosure relates in one embodiment to a reference yaw rate generator for an autonomous vehicle control system. The reference yaw rate generator is configured to generate a reference yaw rate ($r_r$) based on an actual latitudinal position (Y), a desired latitudinal position ($Y_d$), an actual longitudinal position (X), a desired longitudinal position ($X_d$) and an actual heading ($\psi$) of the autonomous ground vehicle.

The present disclosure relates in another embodiment to an autonomous ground vehicle control system for a vehicle having a steering mechanism. The system includes a reference yaw rate generator for an autonomous vehicle control system. The reference yaw rate generator is configured to generate a reference yaw rate based on an actual latitudinal position, a desired latitudinal position, an actual longitudinal position, a desired longitudinal position and an actual heading of the autonomous ground vehicle. The system further includes a yaw rate tracking controller configured to receive the reference yaw rate and configured to adjust a steering mechanism based on the reference yaw rate.

The present disclosure relates in another embodiment to a method for steering an autonomous ground vehicle. The method includes providing an actual latitudinal position (Y), a desired latitudinal position ($Y_d$), an actual longitudinal position (X), a desired longitudinal position ($X_d$) and an actual heading ($\psi$) of the autonomous ground vehicle. The method further includes generating a reference yaw rate ($r_r$) based on the actual latitudinal position (Y), the desired latitudinal position ($Y_d$), the actual longitudinal position (X), the desired longitudinal position ($X_d$) and the actual heading ($\psi$) of the autonomous ground vehicle.

In yet another embodiment, the present disclosure relates to an article comprising a storage medium having stored thereon instructions that when executed by a machine result in the following operations for an autonomous ground vehicle: generating a reference yaw rate ($r_r$) based on an actual latitudinal position (r), a desired latitudinal position ($Y_d$), an actual longitudinal position (X), a desired longitudinal position ($X_d$) and an actual heading ($\psi$) of the autonomous ground vehicle.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

In general, the present disclosure describes a system and method that provides trajectory tracking for an autonomous ground vehicle (AGV). An AGV may be understood to mean a vehicle that travels substantially along a path (i.e., tracks a trajectory) without a human (on-board and/or remotely) providing steering input to the AGV. The path may be predefined and/or may be dynamically determined. It may be desirable for the AGV to travel along the trajectory at a relatively high speed. For example, it may be desirable for the AGV to travel at a speed of about 50 km/h (kilometers per hour). At such a speed, the vehicle dynamics may affect the AGV's ability to track a trajectory and/or maintain stable operation. Vehicle dynamics may include velocity, and/or yaw rate.

The accuracy with which an AGV is tracking a trajectory may be related to a positional error. For example, a positional error may include a distance between a location of the AGV, e.g., measured at or near the AGV's center of gravity and a desired trajectory. A frame of reference for this distance measurement may be inertial, i.e., global, as detected by a global positioning system (GPS), for example. A frame of reference may be local, i.e., relative to the AGV, and may be centered at the AGV's center of gravity.

A positional error may further include a heading or yaw angle. The yaw angle may be the angle between a longitudinal axis of the AGV and the desired heading of the AGV in the inertial frame. It may be appreciated that the heading or yaw angle may provide an angular (i.e., rotational) relationship between the inertial frame and the AGV frame.

A system for controlling an AGV to track a trajectory may detect a position and may command an AGV steering mechanism to adjust the yaw of the AGV. A steering mechanism may include adjusting an angle of one or more wheels relative to the AGV longitudinal axis, individually braking one or more wheels, and/or torque vectoring one or more wheels. At relatively high speeds, vehicle dynamics may affect operation of the vehicle. For example, navigating a tight turn at a relatively high speed may cause the vehicle to roll or spin (i.e., lose traction). It may therefore be desirable to account for vehicle dynamics when controlling an AGV to track a trajectory.

In an embodiment consistent with the present disclosure, a control system may be configured to determine a desired yaw rate and provide commands to the AGV to approach and/or achieve the desired yaw rate. By adjusting the AGV yaw rate, the controller may provide trajectory tracking, i.e., may minimize a tracking error, at relatively high speeds without causing an unstable condition. For example, the AGV yaw rate may be adjusted to minimize a difference between the desired yaw rate and the AGV yaw rate and/or to minimize a lateral distance between the AGV and the trajectory.

Figure 1A:
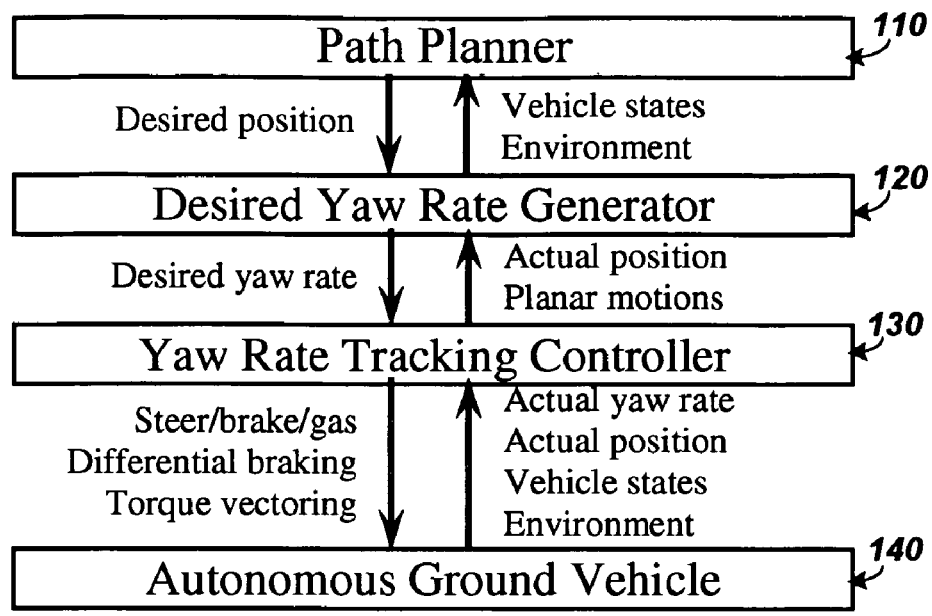
FIGS. 1A and 1B depict a high level system block diagram showing data transfer between subsystems and a control system block diagram of an embodiment of a desired yaw rate generator consistent with the present disclosure, respectively.

Attention is directed to FIG. 1A which depicts an illustrative high level system block diagram of an AGV control system, showing data transfer between subsystems. The AGV control system may include a path planner, e.g., Path Planner 110, a desired yaw rate generator, e.g., Desired Yaw Rate Generator 120, a yaw rate tracking controller, e.g., Yaw Rate Tracking Controller 130 and an autonomous ground vehicle, e.g., AGV 140.

The Path Planner 110, may provide desired position data to the Desired Yaw Rate Generator 120. Desired position data may include an AGV 140 desired location in a global and/or inertial frame. The AGV 140 desired location may include a desired latitudinal position, $Y_d$, and a desired longitudinal position, $X_d$. Desired position data may also include a time derivative of desired latitudinal position, $\dot{Y}_d$, and a time derivative of desired longitudinal position, $\dot{X}_d$. The AGV 140 desired position data may further include a desired heading or yaw angle, $\psi_d$. The Path Planner 110 may receive AGV 140 state and environment information from the Desired Yaw Rate Generator 120. The AGV 140 state and environment information may be provided to the Desired Yaw Rate Generator 120 from the AGV 140 via the Yaw Rate Tracking Controller 130.

The Desired Yaw Rate Generator 120 may receive actual position and planar motion data from the AGV 140 via the Yaw Rate Tracking Controller 130. Actual position data may include actual AGV 140 latitudinal position, Y, actual AGV 140 longitudinal position, X, and actual AGV 140 heading ψ. Planar motion data may include AGV 140 longitudinal velocity, $V_x$, and lateral velocity, $V_y$. The longitudinal velocity, $V_x$, and lateral velocity, $V_y$, may be referenced to a center of gravity of the AGV 140. Accordingly, the AGV 140 may include a global positioning system (GPS) and/or an inertial measurement unit (IMU). The IMU may include one or more gyroscopes and/or one or more accelerometers. $V_x$ and $V_y$ may be determined based on data from the GPS and/or IMU.

The Yaw Rate Tracking Controller 130 may receive a desired yaw rate, i.e., a reference yaw rate, $r_r$, from the Desired Yaw Rate Generator 120. The Yaw Rate Tracking Controller 130 may further receive a time derivative of heading, i.e., actual yaw rate, $\dot{\psi}$, from the AGV 140. The Yaw Rate Tracking Controller 130 may provide a control signal to the AGV 140 that may cause the AGV 140 to adjust the AGV 140 speed and/or heading according to, inter alia, the reference yaw rate, $r_r$, and the actual yaw rate, $\dot{\psi}$.

The Desired Yaw Rate Generator 120 may be configured to generate a reference yaw rate based on the AGV 140 actual position, desired position, actual velocity, desired velocity and/or heading (yaw angle). Accordingly, the reference yaw rate may depend on vehicle dynamics and may be independent of a mechanism that is used to steer the AGV 140. By incorporating yaw rate control that is dependent on vehicle dynamics, the AGV 140 may be commanded to track a trajectory at relatively high speed while maintaining vehicle stability. Further, by determining a reference (desired) yaw rate that is independent of steering mechanism, the Desired Yaw Rate Generator 120 may be used with any appropriate steering mechanism.

In an embodiment, the Yaw Rate Tracking Controller 130 may provide a control signal to the AGV 140 that may change the steering angle of a steering wheel of the AGV 140. In another embodiment, the Yaw Rate Tracking Controller 130 may provide a control signal to the AGV 140 that may cause the AGV 140 to adjust the angle of one or more wheels relative to an axis of the AGV 140. In an embodiment, the AGV 140 may be capable of two wheel steering. In another embodiment, the AGV may be capable of four wheel steering. In yet another embodiment, the Yaw Rate Tracking Controller 130 may command the AGV 140 to brake one or more wheels in order to effect a change in heading, for example. In yet another embodiment, the Yaw Rate Tracking Controller 130 may command the AGV 140 to apply power to one or more wheels, e.g., torque vectoring. In yet another embodiment, the Yaw Rate Tracking Controller 130 may command the AGV 140 to apply a combination of available steering mechanisms to effect a change in heading.

Figure 1B:
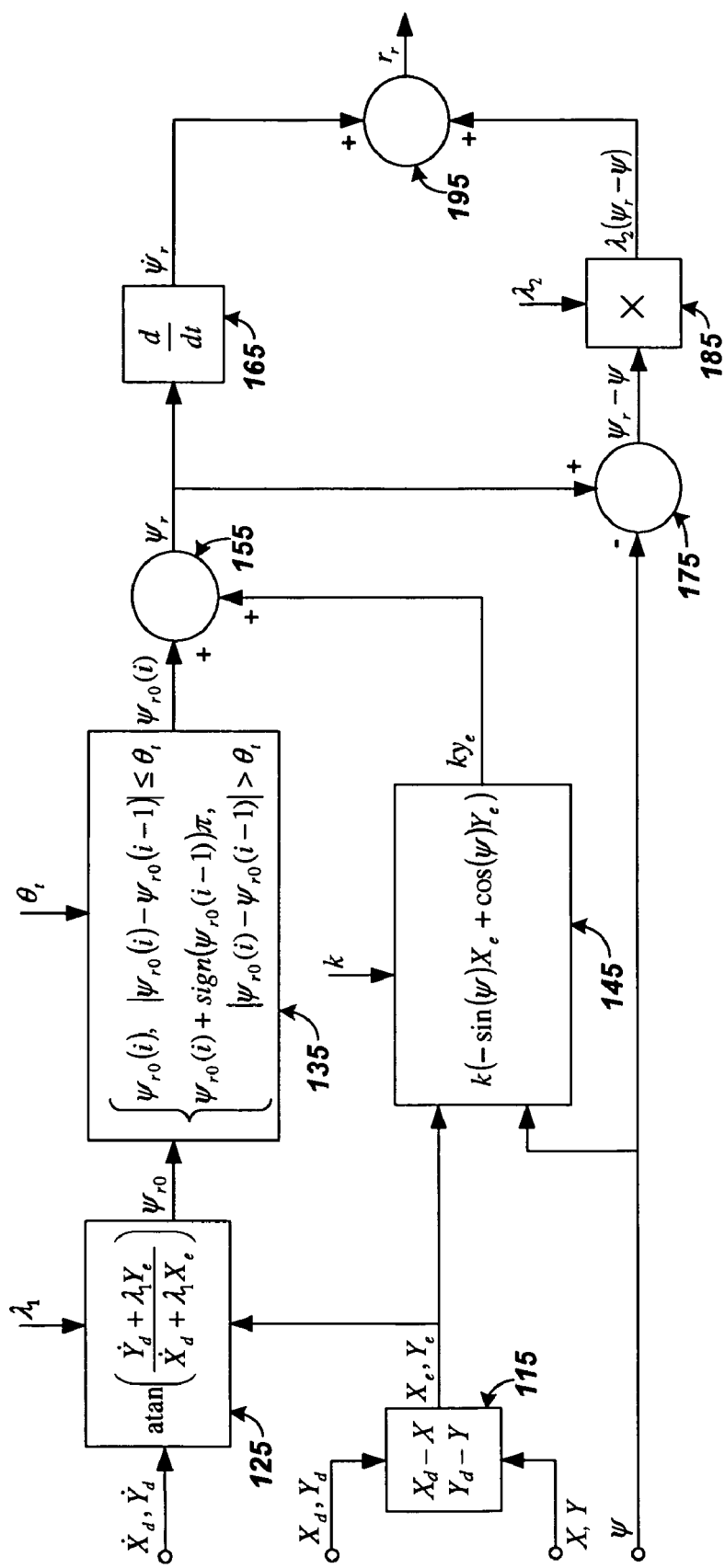

Attention is directed to FIG. 1B which depicts an illustrative control system block diagram of an embodiment of a desired yaw rate generator, e.g., Desired Yaw Rate Generator 120. As discussed with respect to FIG. 1A, inputs to a desired yaw rate generator (from Path Planner 110, for example) may include desired latitudinal and longitudinal positions, $Y_d$ and $X_d$, respectively, and desired time derivatives of desired latitudinal and longitudinal positions, $\dot{Y}_d$ and $\dot{X}_d$, respectively. Inputs may further include actual latitudinal and longitudinal positions, Y and X, respectively, and actual AGV heading, ψ (from the AGV GPS and/or IMU, for example). All of these inputs may be referenced to the inertial (i.e., global) frame.

Figure 2:
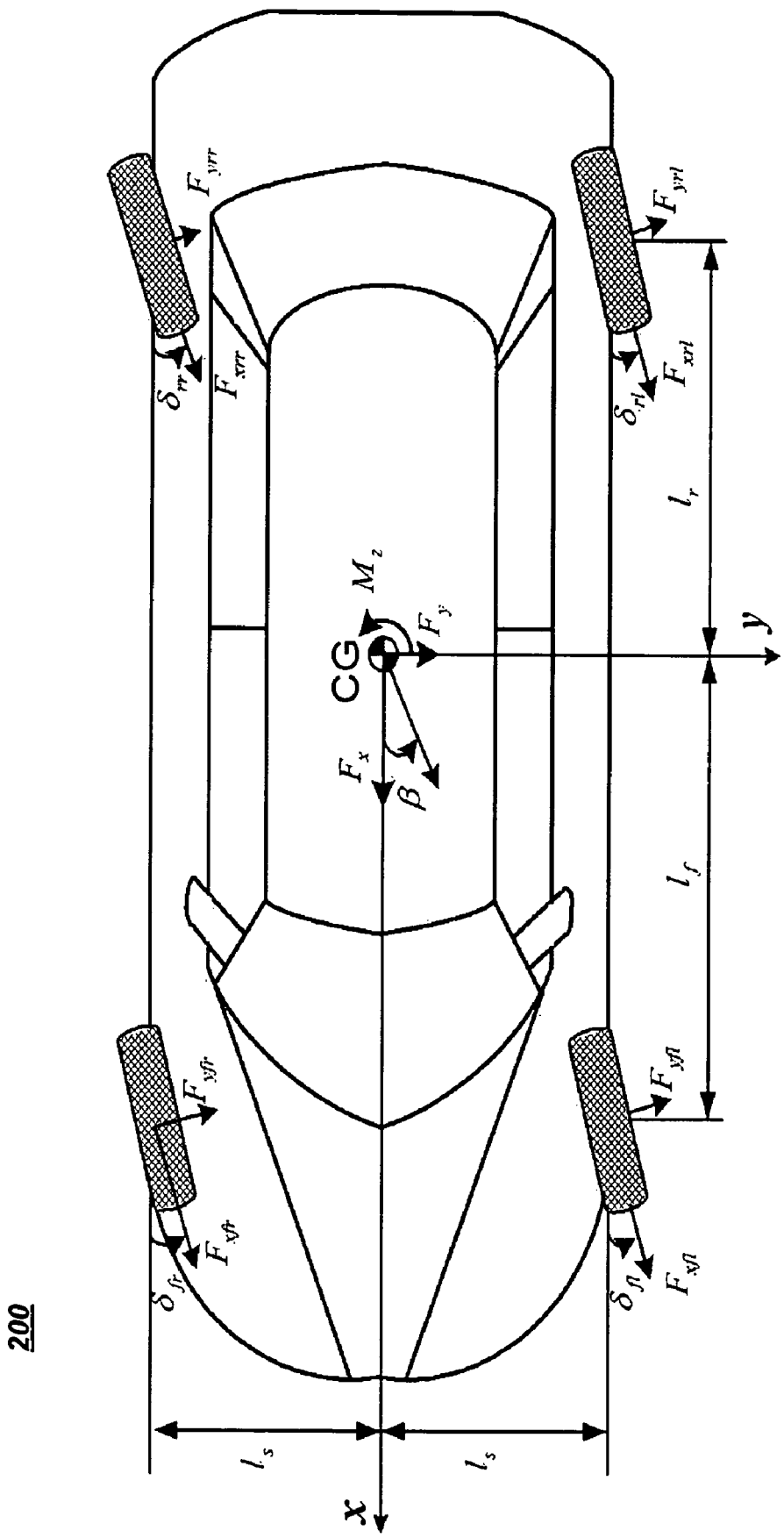
FIG. 2 depicts an illustrative ground vehicle including a vehicle longitudinal axis, x, a vehicle lateral axis, y, and a center of gravity CG.

In an inertial frame, an AGV's global position and heading $(X\ Y\ \psi)^T$ may be described by the following equations of motion as:

$$\dot{X} = V_x \cos(\psi) - V_y \sin(\psi) \tag{1a}$$

$$\dot{Y} = V_x \sin(\psi) + V_y \cos(\psi) \tag{1b}$$

$$\dot{\psi} = r. \tag{1c}$$

where $\dot{Y}$ and $\dot{X}$ are the time derivatives of the actual latitudinal and longitudinal positions, respectively, $\dot{\psi}$ is the yaw rate and r is the yaw rate at the vehicle center of gravity, CG. As discussed above, $V_x$ and $V_y$ are AGV 140 longitudinal velocity and lateral velocity, respectively, referenced to the vehicle center of gravity. For example, a vehicle center of gravity may be located as shown in FIG. 2.

A latitudinal position error, $Y_e$, and a longitudinal position error, $X_e$, may be determined, e.g., control block 115. A heading error, $\psi_e$, may also be determined.

$$X_e = X_d - X \qquad (2a)$$

$$Y_e = Y_d - Y \qquad (2b)$$

$$\psi_e = \psi_d - \psi \qquad (2c)$$

The AGV 140 desired latitudinal position, $Y_d$, desired longitudinal position, $X_d$, and desired heading, $\psi_d$, may be provided by a path planner, for example. The AGV 140 actual longitudinal position, $X$, and actual latitudinal position, $Y$, may be provided by the GPS, for example. The AGV 140 actual heading (yaw), $\psi$, and actual yaw rate, $\dot{\psi}$, may be provided by the IMU, for example.

It may be appreciated that the latitudinal position error, $Y_e$, the longitudinal position error, $X_e$, and the heading error, $\psi_e$, are referenced to the inertial frame. These errors may be transformed to the AGV frame as:

$$\begin{pmatrix} x_e \\ y_e \\ \psi_e \end{pmatrix} = \begin{bmatrix} \cos(\psi) & \sin(\psi) & 0 \\ -\sin(\psi) & \cos(\psi) & 0 \\ 0 & 0 & 1 \end{bmatrix} \begin{pmatrix} X_e \\ Y_e \\ \psi_e \end{pmatrix} \qquad (3)$$

where $x_e$ is the longitudinal position error in the vehicle frame and $y_e$ is the lateral position error in the vehicle frame, i.e., both referenced to the vehicle center of gravity, and $\psi_e$ is the heading error.

In an embodiment, trajectory tracking may include minimizing the lateral position error, $y_e$. A control law may be defined to specify a desired yaw rate to minimize the longitudinal position error, $y_e$. For example, a time derivative, $\dot{y}_e$, of the lateral position error may be defined as:

$$\dot{y}_e = -\lambda_1 y_e, \quad \lambda_1 \in \Re^+ \qquad (4)$$

where $\lambda_1$ is a control gain (a parameter that adjusts the sensitivity to latitudinal and longitudinal position error). Using equations (3) and (4) and assuming that the AGV longitudinal speed tracking control is well-conducted, i.e., $x_e$ is small, yields:

$$-\sin(\psi)\dot{X}_d + \cos(\psi)\dot{Y}_d - V_y = \lambda_1 \sin(\psi) X_e - \lambda_1 \cos(\psi) Y_e. \qquad (5)$$

It should be noted that, consistent with the present disclosure, the AGV longitudinal speed, $V_x$, may be tracked by another controller. In other words, the desired yaw rate generator, e.g., FIG. 1, 120, and the yaw rate tracking controller, e.g., FIG. 1, 130, may not directly control the AGV longitudinal speed, $V_x$.

It may be appreciated that the AGV lateral velocity, $V_y$, may typically be relatively much smaller than the AGV's longitudinal velocity, $V_x$. Ignoring $V_y$ in equation (5), and after algebraic manipulation, yields:

$$\psi_{r0} = \operatorname{atan}\left(\frac{\dot{Y}_d + \lambda_1 Y_e}{\dot{X}_d + \lambda_1 X_e}\right) \qquad (6)$$

where atan is arctangent (inverse tangent) and $\psi_{r0}$ is an intermediate reference heading. Referring again to FIG. 1B, equation (6) corresponds to control block 125 with $\dot{X}_d$, $\dot{Y}_d$, $X_e$ and $Y_e$, as inputs, $\lambda_1$ as control gain and $\psi_{r0}$ as output.

It may be appreciated that the arctangent function, and therefore $\psi_{r0}$, has discontinuities corresponding to angles of $$\pm\left(l + \frac{1}{2}\right)\pi,$$

$l=0, 1, 2, \ldots$. This may occur when $\dot{X}_d + \lambda_1 X_e \to 0$ in equation (6). The discontinuities appear as a jump of $\pi$ in the arctangent function and are a result of the arctangent being a multivalued function and the convention that an arctangent of a real number lie in the range $-\pi/2$ to $+\pi/2$. It may be appreciated that the actual AGV heading is not discontinuous. To account for this mathematical discontinuity, a sampled intermediate reference heading $\psi_{r0}(i)$, may be filtered according to equation (7):

$$\psi_{r0}(i) = \begin{cases} \psi_{r0}(i), & |\psi_{r0}(i) - \psi_{r0}(i-1)| \le \theta_t \\ \psi_{r0}(i) + \operatorname{sign}(\psi_{r0}(i-1))\pi, & |\psi_{r0}(i) - \psi_{r0}(i-1)| > \theta_t \end{cases} \qquad (7)$$

where $\psi_{r0}(i)$ corresponds to a current sample, $\psi_{r0}(i-1)$ corresponds to a prior sample, one time step ago and $\theta_t$ is a switching threshold. The effect of equation (7) is to correct for the $\pi$ jump when the denominator in equation (6) changes sign and thereby maintain continuity in the intermediate reference heading.

The switching threshold, $\theta_t$, may be set to a value between a maximum intermediate reference heading step size and $\pi$. The maximum intermediate reference heading step size may depend on sample rate. For example, for the simulation results discussed below, $\theta_t$ was set to $\pi/2$. Referring again to FIG. 1B, equation (7) corresponds to block 135 with $\psi_{r0}$ and $\theta_t$ as inputs and a filtered $\psi_{r0}(i)$ as output.

It may be appreciated that, although not always explicitly shown, the parameters in this system are discrete, i.e., sampled in time. The sample index, i, is explicitly shown in equation (7) and block 135 because the functionality of the filter of equation (7) and block 135 may depend on the relative sample indices. Accordingly, the sample index, i, may be implicitly understood where it is not explicitly shown.

Equation (6) was derived ignoring AGV lateral velocity $V_y$. Accordingly, a tracking error may be introduced, especially during turning maneuvers when lateral velocity may be relatively greater than during substantially straight travel. To reduce the effect of ignoring AGV lateral velocity, a relatively small feedback term may be added to the intermediate reference heading $\psi_{r0}$. For example, a weighted lateral position error, $ky_e$, may be added where (from equation (3) above)

$$y_e = -\sin(\psi)X_e + \cos(\psi)Y_e \qquad (8)$$

and k is a weight (i.e., may adjust the sensitivity of the reference yaw rate to the lateral position error). Referring to FIG. 1B, equation (8) and the weight, k, are shown in block 145 with $X_e$, $Y_e$, and $\psi$ as inputs, k as control gain (weight) and $ky_e$ as output. This feedback term may then be added to the intermediate reference heading, $\psi_{r0}$, at summing junction 155 to yield:

$$\psi_r = \psi_{r0} + ky_e \qquad (9)$$

It may be appreciated that equation (9) represents a desired reference heading that is based on AGV dynamics and the weighting parameters (gains) $\lambda_1$ and k. A desired reference yaw rate, $r_r$, may be specified based on the desired reference heading, $\psi_r$. The desired yaw rate may then be provided to the Yaw Rate Tracking Controller 130 which may then provide one or more steering signals to the AGV 140. As used herein, a steering signal may include a command to adjust an angle of one or more wheels, a command to apply differential braking to one or more wheels and/or a command to apply differential power to one or more wheels, i.e., torque vectoring.

The desired reference yaw rate may be determined in one or more ways. For example, an intermediate desired reference yaw rate, $\dot{\psi}_r$, may be defined as the time derivative of the reference heading, $\psi_r$. However, this intermediate desired reference yaw rate does not account for a magnitude of a heading error. A desired reference yaw rate, $r_r$, that includes the magnitude of the heading error, can be defined as:

$$r_r = \dot{\psi}_r + \lambda_2(\psi_r - \psi), \lambda_2 \in \Re^+ \qquad (10)$$

where $\dot{\psi}_r$ is the time derivative of the desired reference heading, $\psi_r$, $\psi$ is the actual heading, and $\lambda_2$ is a control gain.

Referring again to FIG. 1B, block 165 represents the first term on the right side of equation (10) and block 185 represents the second term. The difference between the reference heading and the actual heading may be determined in block 175. Block 195 depicts a summing junction, adding the first and second terms on the right side of equation (10), and yielding the desired reference yaw rate, $r_r$. Referring to FIG. 1A, the desired reference yaw rate, $r_r$, may be a desired yaw rate that is provided to the Yaw Rate Tracking Controller 130 from the Desired Yaw Rate Generator 120.

As discussed above, once the Yaw Rate Tracking Controller 130 has received the desired reference yaw rate, $r_r$, it may command the AGV 140 to adjust its yaw rate, using whatever steering mechanism may be available e.g., two or four wheel steering, differential braking, torque vectoring or the like. It may be appreciated that the desired reference yaw rate, $r_r$, may be determined and/or updated and then provided to the Yaw Rate Tracking Controller 130 in real time.

As further discussed above, the particular control mechanism used to track yaw rate may be independent of the manner in which the reference yaw rate is determined. The yaw rate tracking control approach may therefore be constrained only in that it must be capable of tracking a desired yaw rate. One example of yaw rate tracking control follows. In this example, a general yaw rate tracking control is derived. The general yaw rate tracking control may account for a variety of steering mechanisms. The general yaw rate tracking control is then simplified for a two-wheel steering, rear wheel drive vehicle to correspond to an actual test vehicle.

Vehicle planar motion (e.g., longitudinal speed, lateral speed, and yaw rate) may be of interest for vehicle dynamic control. FIG. 2 depicts an illustrative ground vehicle. The simplified equations of motion for the vehicle dynamics may be written as:

$$m_v(\dot{V}_x - rV_y) = F_x, \qquad (11a)$$

$$m_v(\dot{V}_y + rV_x) = F_y, \qquad (11b)$$

$$I_z \dot{r} = M_z. \qquad (11c)$$

where $m_v$ is the vehicle mass (including both sprung and unsprung mass), $V_x$ is vehicle velocity along the x axis (i.e., longitudinal velocity), $V_y$ is vehicle velocity along the y axis (i.e., lateral velocity), and $I_z$ is moment of inertia about the z axis, which is perpendicular to the y plane. The coordinates x, y, z are body-fixed at the center of gravity of the vehicle, CG. The generalized external forces that may act along the vehicle x and y axes are $F_x$ and $F_y$, and the generalized moment is $M_z$ about the z axis. As discussed above, each of the four tires (wheels) may independently drive, brake, and steer. Thus, these generalized forces/moment may be expressed as:

$$F_x = F_{xfl}\cos\delta_{fl} - F_{yfl}\sin\delta_{fl} + F_{xfr}\cos\delta_{fr} - F_{yfr}\sin\delta_{fr} + \qquad (12a)$$
$$F_{xrl}\cos\delta_{rl} - F_{yrl}\sin\delta_{rl} + F_{xrr}\cos\delta_{rr} - F_{yrr}\sin\delta_{rr},$$

$$F_y = F_{xfl}\sin\delta_{fl} + F_{yfl}\cos\delta_{fl} + F_{xfr}\sin\delta_{fr} + F_{yfr}\cos\delta_{fr} + \qquad (12b)$$
$$F_{xrl}\sin\delta_{rl} + F_{yrl}\cos\delta_{rl} + F_{xrr}\sin\delta_{rr} + F_{yrr}\cos\delta_{rr},$$

$$M_z = l_s(-F_{xfl}\cos\delta_{fl} + F_{yfl}\sin\delta_{fl} - F_{xrl}\cos\delta_{rl} + F_{yrl}\sin\delta_{rl}) + \qquad (12c)$$
$$l_s(F_{xfr}\cos\delta_{fr} - F_{yfr}\sin\delta_{fr} + F_{xrr}\cos\delta_{rr} - F_{yrr}\sin\delta_{rr}) +$$
$$l_f(F_{xfl}\sin\delta_{fl} + F_{yfl}\cos\delta_{fl} + F_{xfr}\sin\delta_{fr} + F_{yfr}\cos\delta_{fr}) +$$
$$l_r(-F_{xrl}\sin\delta_{rl} - F_{yrl}\cos\delta_{rl} - F_{xrr}\sin\delta_{rr} - F_{yrr}\cos\delta_{rr}).$$

It may be appreciated that in these relations, $\delta_{**}$ is the steering angle of a given wheel, with the first subscript representing front/rear and the second subscript right/left.

Figure 3A:
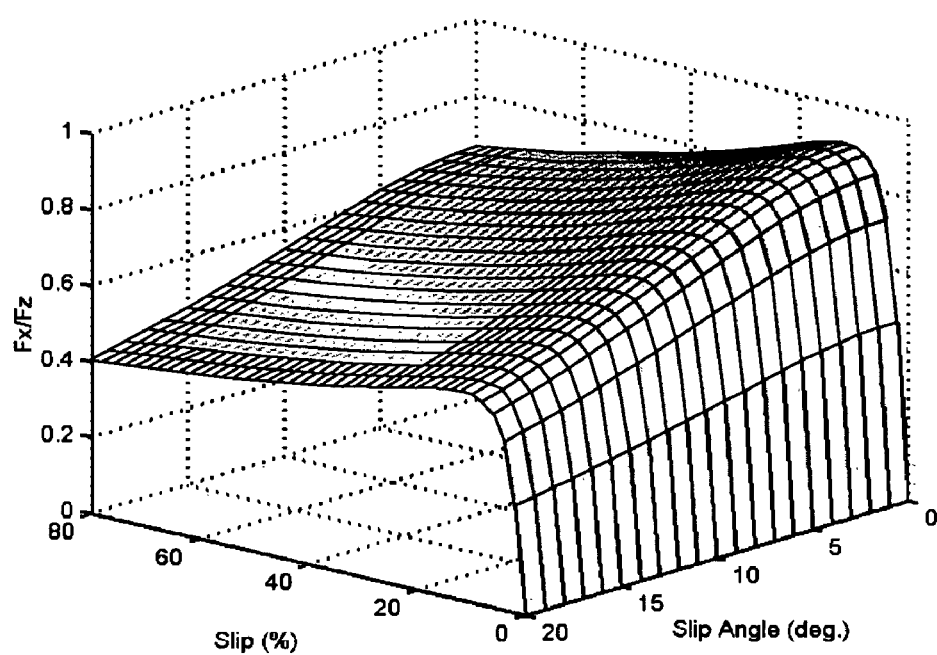
FIGS. 3A and 3B are plots of normalized tire longitudinal and lateral forces, respectively, as a function of slip and slip angle, for an illustrative AGV.
Figure 3B:
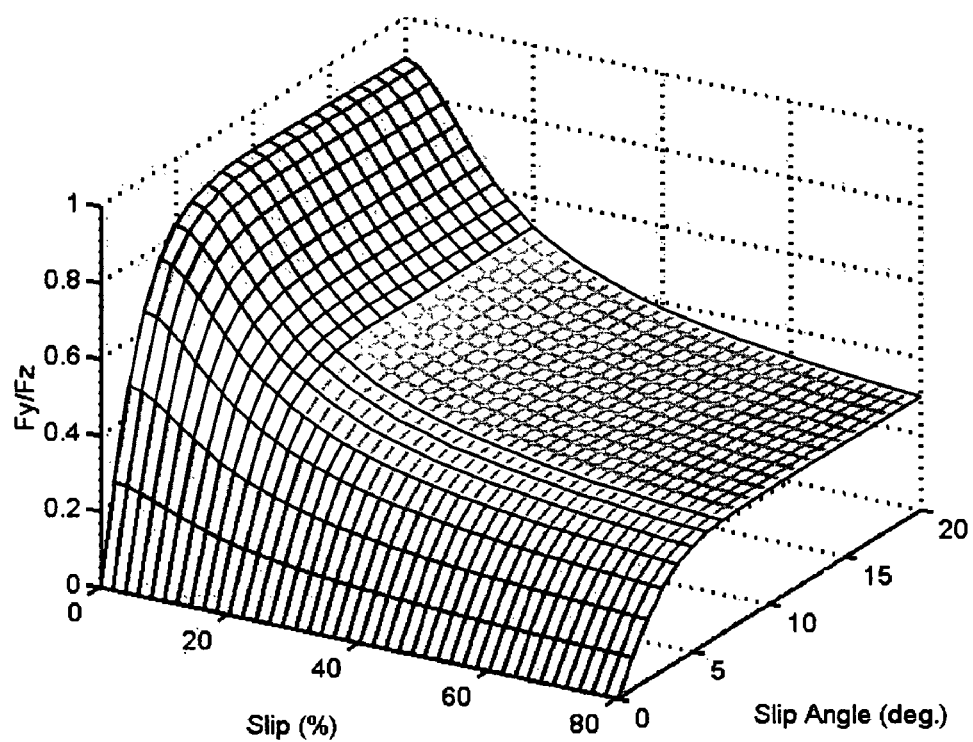

Tires may be the only vehicle components generating external forces that can be effectively manipulated to affect vehicle motions. Tires are therefore important for vehicle dynamics and control. Tire longitudinal force, lateral force, and aligning moment may be complex nonlinear functions of tire normal force, slip, slip angle, and tire-road friction coefficient. FIG. 3A and FIG. 3B depict examples of normalized longitudinal and lateral tire forces, respectively, as functions of slip and slip angle for a tire-road friction coefficient of 0.9.

A tire model may describe a dependence of a tire force on slip, slip angle, friction coefficient, tire normal force, as well as a coupling between tire longitudinal and lateral forces. Accordingly, longitudinal tire slip may be defined as:

$$s_i = \frac{\omega_{wyi}R_i - V_{xi}}{V_{xi}} = \frac{\omega_{wyi}R_i}{V_{xi}} - 1 \qquad (13)$$

where $\omega_{wyi}$ is wheel rotational speed along a wheel y axis, $V_{xi}$ is the longitudinal speed of the wheel center as a function of vehicle CG velocities, yaw rate and wheel steering angles, and $R_i$ is the tire effective radius, with a specific tire indicated by subscript i∈(fl fr rl rr). (Note that the subscript i used here is not the time sample index discussed above.) The slip angle for each tire may be calculated as:

$$\alpha_{fl} = -\delta_{fl} + \tan^{-1}\left(\frac{V_y + rl_f}{V_x - rl_s}\right) \qquad (14a)$$

$$\alpha_{fr} = -\delta_{fr} + \tan^{-1}\left(\frac{V_y + rl_f}{V_x + rl_s}\right) \qquad (14b)$$

$$\alpha_{rl} = -\delta_{rl} + \tan^{-1}\left(\frac{V_y - rl_r}{V_x - rl_s}\right) \qquad (14c)$$

$$\alpha_{rr} = -\delta_{rr} + \tan^{-1}\left(\frac{V_y - rl_r}{V_x + rl_s}\right) \qquad (14d)$$

For notational simplicity, slip angle may be represented as:

$$\alpha_i = f_{\alpha i}(\delta_i, \xi) \qquad (15)$$

where $\xi = [V_x, V_y, r]^T$ is the vehicle motion vector.

Many tire models exist. For control simplicity, the following models may be adopted.

$$F_{xi} = F_{zi}K_x(\mu)s_i \qquad (16a)$$

$$F_{yi} = F_{zi}K_y(\mu)\alpha_i \qquad (16b)$$

It may be appreciated that this tire model may be valid when a tire is not experiencing significant longitudinal and lateral forces simultaneously.

Referring to equations 16a and 16b, it may be appreciated that the amplitudes of a tire longitudinal and lateral forces directly depend on the tire's normal force $F_{zi}$. The static tire normal load can be calculated from the equations:

$$F_{zfl0} = \frac{m_v g l_r}{2(l_f + l_r)} \quad (17a)$$

$$F_{zfr0} = \frac{m_v g l_r}{2(l_f + l_r)} \quad (17b)$$

$$F_{zrl0} = \frac{m_v g l_f}{2(l_f + l_r)} \quad (17c)$$

$$F_{zrr0} = \frac{m_v g l_f}{2(l_f + l_r)} \quad (17d)$$

For vehicle dynamics control systems, the effect of the load transfers due to vehicle sprung mass longitudinal and lateral accelerations may be considered in order to closely approximate the actual tire normal load during driving. For simplicity, it may be assumed that a front roll center height and a rear roll center height of the vehicle (sprung mass and unsprung mass) are the same. The dynamic load transfer of each tire may then be calculated from $$\delta F_{zfl} = -\frac{m_{vs} a_x h_g}{2(l_f + l_r)} - \frac{m_{vs} a_y h_r \kappa_f}{2 l_s} \quad (18a)$$

$$\delta F_{zfr} = -\frac{m_{vs} a_x h_g}{2(l_f + l_r)} + \frac{m_{vs} a_y h_r \kappa_f}{2 l_s} \quad (18b)$$

$$\delta F_{zrl} = \frac{m_{vs} a_x h_g}{2(l_f + l_r)} - \frac{m_{vs} a_y h_r \kappa_r}{2 l_s} \quad (18c)$$

$$\delta F_{zrr} = \frac{m_{vs} a_x h_g}{2(l_f + l_r)} + \frac{m_{vs} a_y h_r \kappa_r}{2 l_s} \quad (18d)$$

where, $\kappa_f$, $\kappa_r$ are roll stiffness factors of the front and rear suspension, respectively, and $\kappa_f + \kappa_r = 1$. This estimation approach depends on the vehicle body longitudinal and lateral accelerations. These quantities may be measured by a GPS and/or IMU. Bias issues that may be associated with the inertial sensors can be overcome by sensor fusion methods, for example.

For example, a vehicle with rear two-wheel drive and front two-wheel steering, yields $\delta_{fl} = \delta_{fr} = \delta_s$, $\delta_{rl} = \delta_{rr} = 0$. In this example, a Ford/Explorer XLS was used as the target AGV platform. Since the vehicle has a rear wheel drive, the longitudinal forces of the front tires may be ignored and the longitudinal forces of the rear tires were assumed to be the same. With these simplifications, the yaw moment acting on the vehicle center of gravity, CG, then becomes $$M_z = l_s \sin \delta_s (F_{xfl} - F_{xfr}) + l_f \cos \delta_s (F_{yfl} - F_{yfr}) - l_r (F_{yrl} - F_{yrr}). \quad (19)$$

For normal steering angle ranges, $\delta_s$ may be relatively small so that $\cos \delta_s \approx 1$ and the first term in equation (19) may be ignored. Equation (19) may then be further simplified as $$M_z = -l_r (F_{yrl} + F_{yrr}) + \Delta M + l_f [F_{zfl} K_y(\mu_{fl}) \alpha_{fl} + F_{zfr} K_y(\mu_{fr}) \alpha_{fr}] \quad (20)$$

where $\Delta M$ is the yaw moment caused by the ignored terms. Substituting (14) and (16) into (20), yields $$M_z = -l_r (F_{zrl} K_y(\mu_{rl}) \alpha_{rl} + F_{zrr} K_y(\mu_{rr}) \alpha_{rr}) + l_f F_{zfl} K_y(\mu_{fl}) \quad (21)$$

$$\text{atan}\left(\frac{V_y + r l_f}{V_x - r l_s}\right) + l_f F_{zfr} K_y(\mu_{fr}) \text{atan}\left(\frac{V_y + r l_f}{V_x + r l_s}\right) + \Delta M -$$

$$l_f [F_{zfl} K_y(\mu_{fl}) + F_{zfr} K_y(\mu_{fr})] \delta_s$$

$$= g(\cdot) - \frac{l_f}{R_s} [F_{zfl} K_y(\mu_{fl}) + F_{zfr} K_y(\mu_{fr})] \delta_{sw}$$

where $R_s$ is the steering mechanism gear ratio.

Recognizing that there may be some parametric uncertainties (e.g., payload and road condition variations) and unmodeled dynamics (e.g., roll and pitch motions), sliding mode control (SMC) may be used for the yaw rate tracking to enhance system robustness and address system nonlinearities. A sliding surface for the yaw rate tracking control may be defined as:

$$S_r = r - r_r + \lambda_r (\psi - \psi_{ri}). \quad (22)$$

A time derivative of the surface is:

$$\dot{S}_r = \dot{r} - \dot{r}_r + \lambda_r \dot{\psi} - \lambda_r \dot{\psi}_{ri} = \frac{1}{I_z} M_z - \dot{r}_r + \lambda_r r - \lambda_r r_r. \quad (23)$$

A Lyapunov function candidate may be:

$$V_r = \frac{1}{2} S_r^2 \geq 0. \quad (24)$$

The Lyapunov function candidate's derivative may be given by $$\dot{V}_r = S_r \dot{S}_r. \quad (25)$$

$\dot{V}_r$ should be less than or equal to $-\eta_r |S_r|$ to ensure the attractiveness of the sliding surface. The following control law may meet this requirement $$\delta_{sw} = \frac{I_z [\bar{g}(\cdot)/I_z - \dot{r}_r + \lambda_r r - \lambda_r r_r + \eta_r \text{sgn}(S_r)]}{\frac{l_f}{R_s} [\overline{F}_{zfl} K_y(\mu_{fl}) + \overline{F}_{zfr} K_y(\mu_{fr})]} \quad (26)$$

where $\bar{g}$ and $\overline{F}_{z*}$ are the nominal values of $g$ and $F_{z*}$, respectively, and may be calculated from equations (17) and (18) based on GPS and/or IMU data. Thus, $S_r$ may be asymptotically stable. In other words, $S_r = r - r_r + \lambda_r (\psi - \psi_{ri}) \to 0$ as $t \to \infty$. From the Final-Value Theorem, $(r - r_r) \to 0$ and $(\psi - \psi) \to 0$ as $t \to \infty$. Accordingly, the tracking objectives may be fulfilled. To avoid a chattering effect that may be caused by the sign function in the control law, the following saturation function may be used to replace the sgn function $$\text{sat}\left(\frac{S_r}{\phi_r}\right) = \begin{cases} S_r / \phi_r & \text{if } |S_r| < \phi_r \\ \text{sgn}(S_r / \phi_r) & \text{if } |S_r| \geq \phi_r. \end{cases} \quad (27)$$

It may be appreciated that the yaw rate controller discussed above is just one example of a yaw rate controller that may receive a desired yaw rate from the yaw rate generator. It may also be appreciated that the particular yaw rate controller chosen may depend on the steering mechanisms available in a vehicle, e.g., two or four wheel steering, independent wheel braking and/or independent wheel powering (i.e., torque vectoring). In the experimental results discussed below, the test vehicle was a Ford Explorer XLS, with rear two-wheel drive, with front two-wheel steering, without independent wheel braking and without independent wheel powering. The test vehicle was simulated using CarSim®, a vehicle dynamic simulation program available from Mechanical Simulation Corporation.

Figure 4:
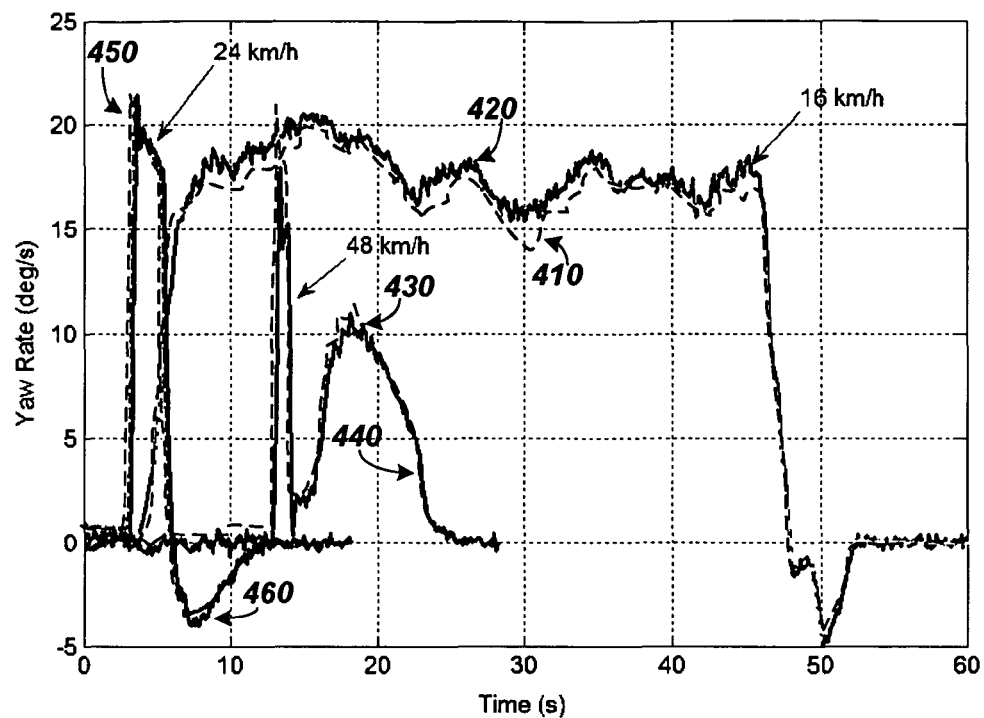
FIG. 4 depicts plots of yaw rates for a simulated AGV and an actual AGV for step-steering maneuvers at speeds of 16, 24 and 28 km/h.

The CarSim® vehicle simulation was validated against an actual Ford Explorer XLS test vehicle, using step-steering maneuvers at three vehicle speeds: 16 km/h, 24 km/h and 48 km/h. FIG. 4 includes plots of yaw rate in degrees per second as a function of time for the three vehicle speeds. The solid lines, e.g., 420, 440, 460, are the results from the actual test vehicle and the dotted lines, e.g., 410, 430, 450, are the results from the CarSim® simulation. It may be appreciated that the CarSim® simulation adequately captures the vehicle dynamics.

For the illustrative experimental results that follow, the CarSim® simulation of the Ford Explorer XLS was used. The speed of the test vehicle was set at about 50 km/h. A proportional-integral controller was used to track vehicle speed. As a trajectory tracking comparison, also using the CarSim® simulation, a proportional-integral controller was implemented with the vehicle local lateral position error as a reference input and a steering command as output. Accordingly, each of the plots that follow includes illustrative yaw rate control, consistent with the present disclosure, and position error control, for comparison.

Figure 5:
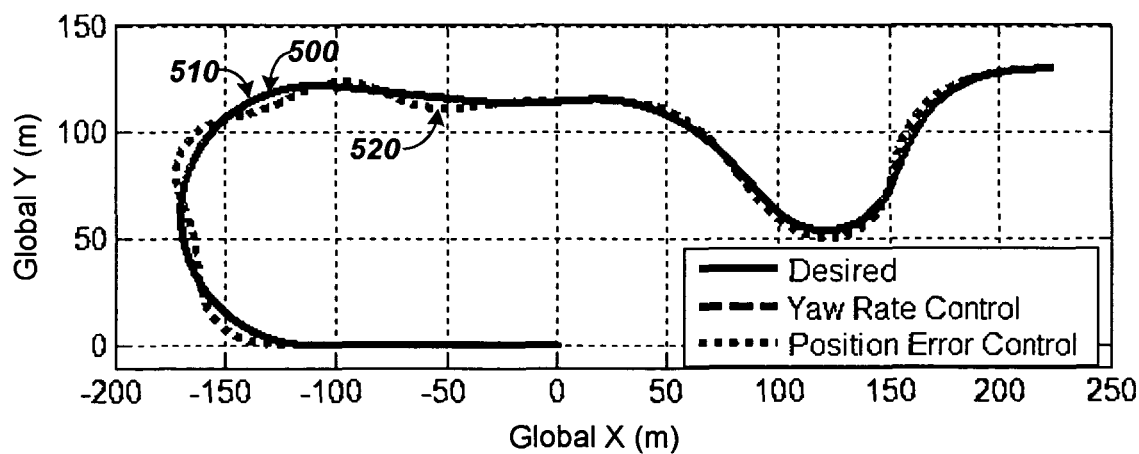
FIG. 5 depicts an example of a vehicle desired trajectory and simulation results as a function of global positions X and Y.
Figure 6A:
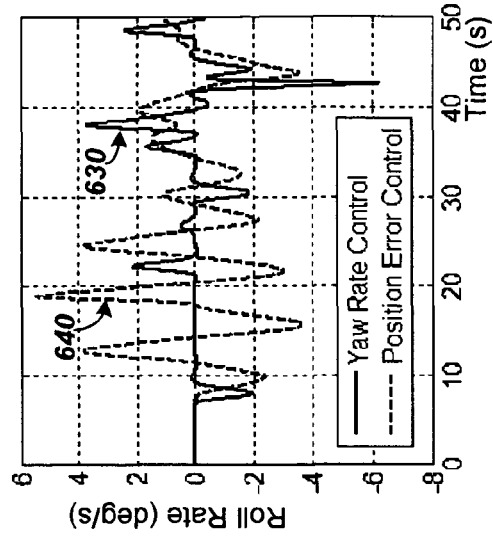
FIGS. 6A through 6D show plots of simulation data for yaw rate, roll rate, and vehicle longitudinal and lateral velocities, respectively, for the vehicle desired trajectory depicted in FIG. 5.
Figure 6B:
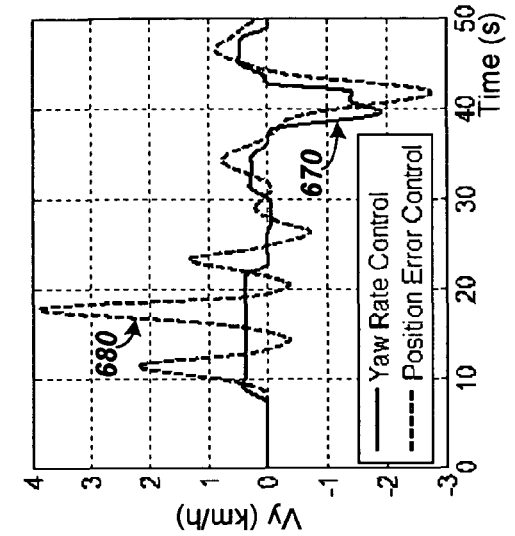
Figure 6C:
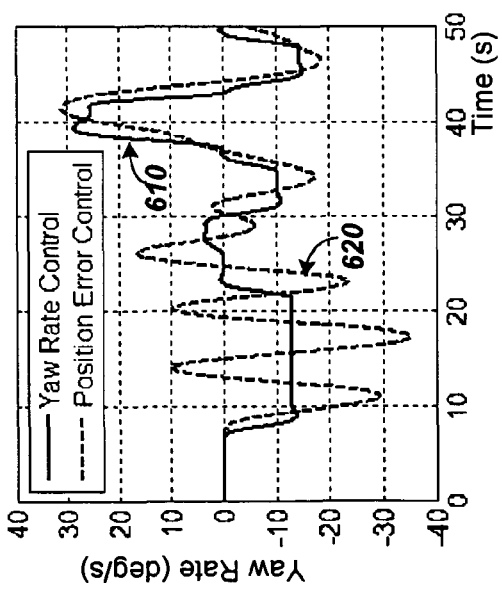
Figure 6D:
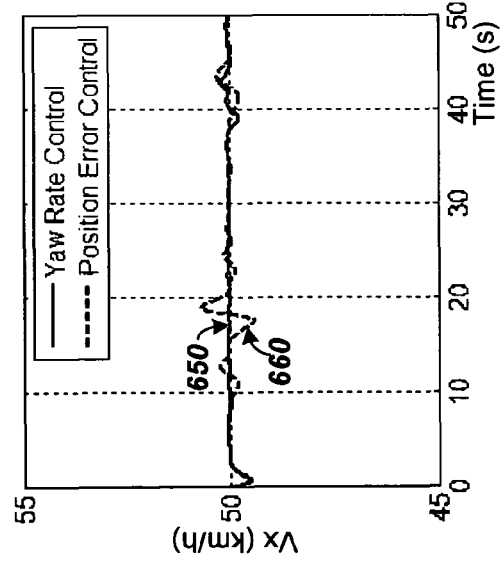

Attention is directed to FIG. 5 which depicts an illustrative desired trajectory 500, a simulated vehicle path 510 for yaw rate control (i.e., implementing a yaw rate generator, consistent with the present disclosure) and a simulated vehicle path 520 for position error control. For the yaw rate control, the control gains, $\lambda_1$, $\lambda_2$, and k (FIG. 1B), were set, for example, to about 1.0, 1.0 and 0.01, respectively. FIG. 5 illustrates lateral and longitudinal positions Y, X, in the global (inertial) frame. It may be appreciated that the trajectory begins at approximately X=0 and Y=0, and illustrates substantially straight line travel followed by a smooth curve, relatively shallow curves and relatively sharp curves. The path for yaw rate control 510 appears to track the desired trajectory 500 relatively closely while the path for position error control 520 appears to overshoot and/or undershoot the desired trajectory 500 near heading changes, i.e., curves.

FIGS. 6A through 6D depict vehicle yaw rate, $\dot{\psi}$, roll rate, longitudinal velocity, $V_x$, and lateral velocity, $V_y$, respectively, with respect to time, for the trajectory illustrated in FIG. 5. Yaw rate control is depicted with a solid line, e.g., 610, 630, 650, 670 and position error control is shown with a dotted line, e.g., 620, 640, 660, 680. Yaw rate control appears to exhibit generally less oscillation than position error control, particularly during the smooth curve (i.e., time interval of approximately 10 to approximately 22 seconds).

Figure 7:
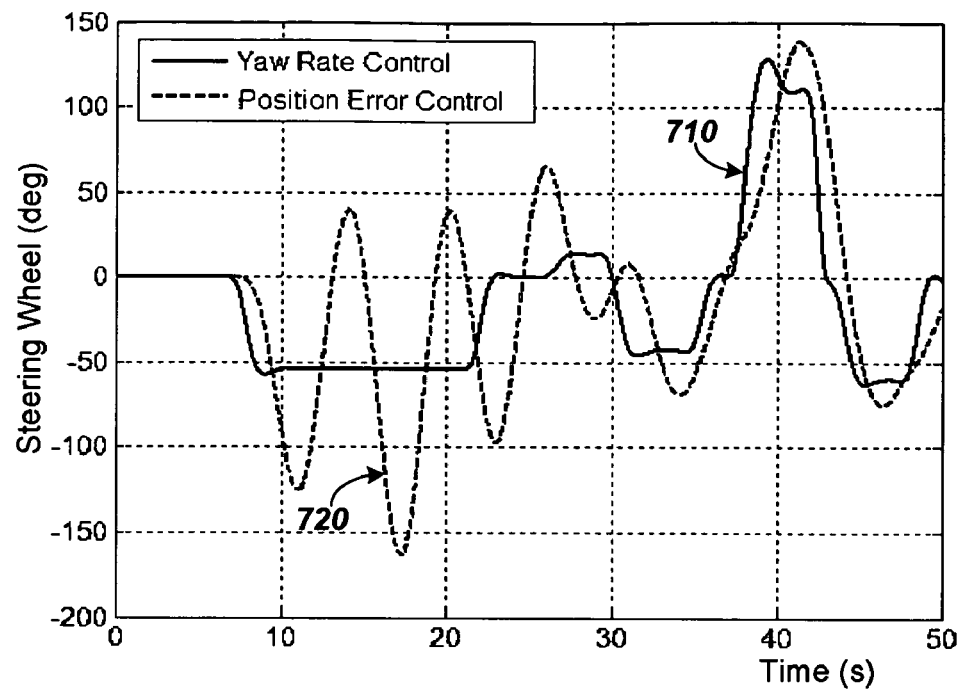
FIG. 7 shows plots of simulation data for autonomous ground vehicle steering wheel angle for the vehicle desired trajectory depicted in FIG. 5.
Figure 8:
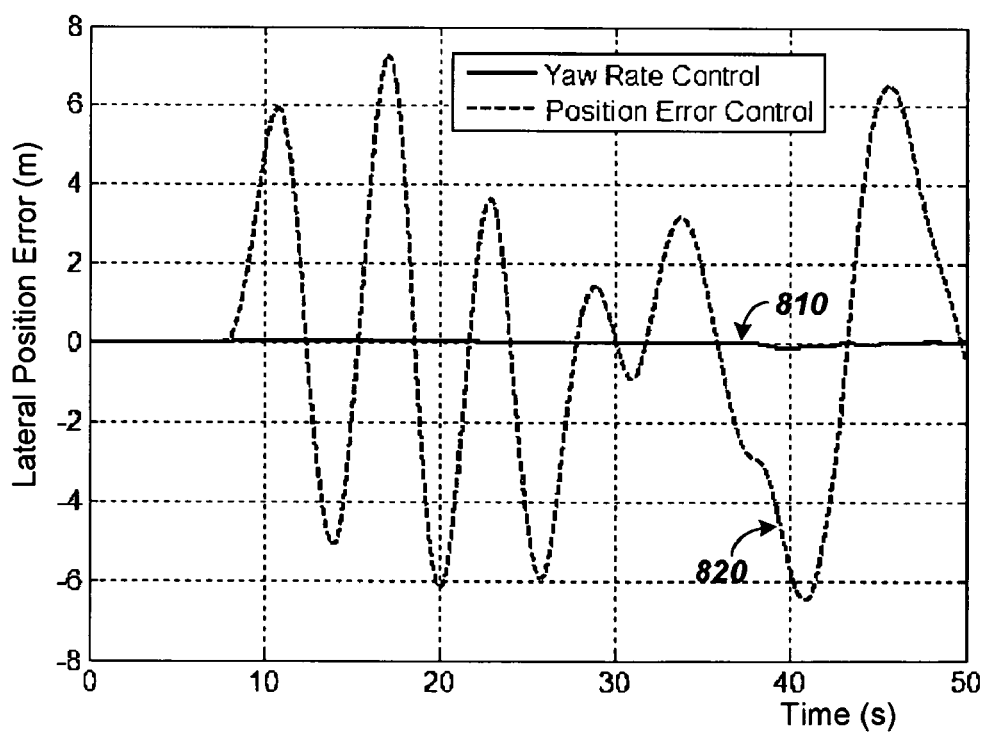
FIG. 8 shows plots of simulation data for AGV lateral position error for the vehicle desired trajectory depicted in FIG. 5.

FIG. 7 depicts steering wheel angle and FIG. 8 depicts lateral position error, with respect to time, for the trajectory illustrated in FIG. 5. Yaw rate control is shown with a solid line, e.g., 710, 810, and position error control is shown with a dotted line, e.g., 720, 820. Referring to FIG. 7, yaw rate control appears to exhibit generally less oscillation than position error control for steering wheel angle, particularly during the smooth curve. Referring to FIG. 8, yaw rate control appears to exhibit generally less oscillation over the entire trajectory for lateral position error. It may be appreciated that yaw rate control appears to track the trajectory relatively better than position error control, in general.

Figure 9:
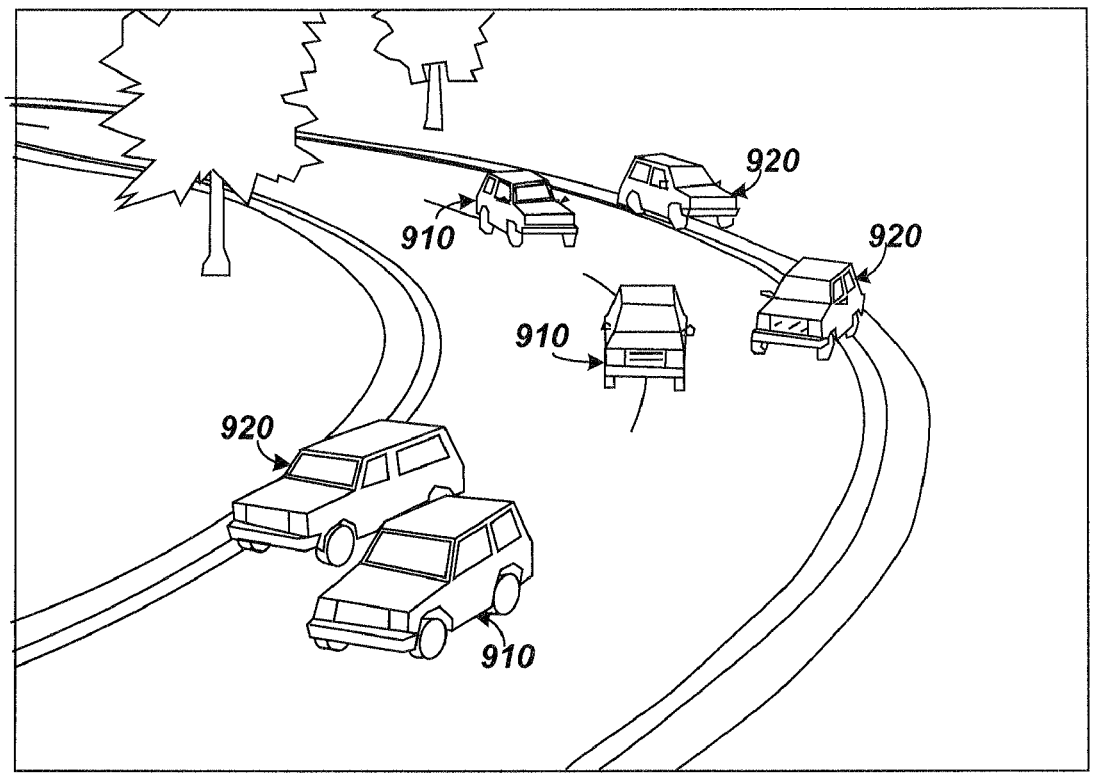
FIG. 9 illustrates vehicle tracking for an embodiment consistent with the present disclosure and an example tracking control system that uses only position error, for the vehicle desired trajectory depicted in FIG. 5.

FIG. 9 depicts a CarSim® image showing two simulated test vehicles at three positions on a curved trajectory. A dark vehicle 910 corresponds to yaw rate control, consistent with the present disclosure, and a light vehicle 920 corresponds to position error control. The dark vehicle 910 appears to track a centerline of the curved trajectory relatively closely while the light vehicle 920 does not.

Figure 10:
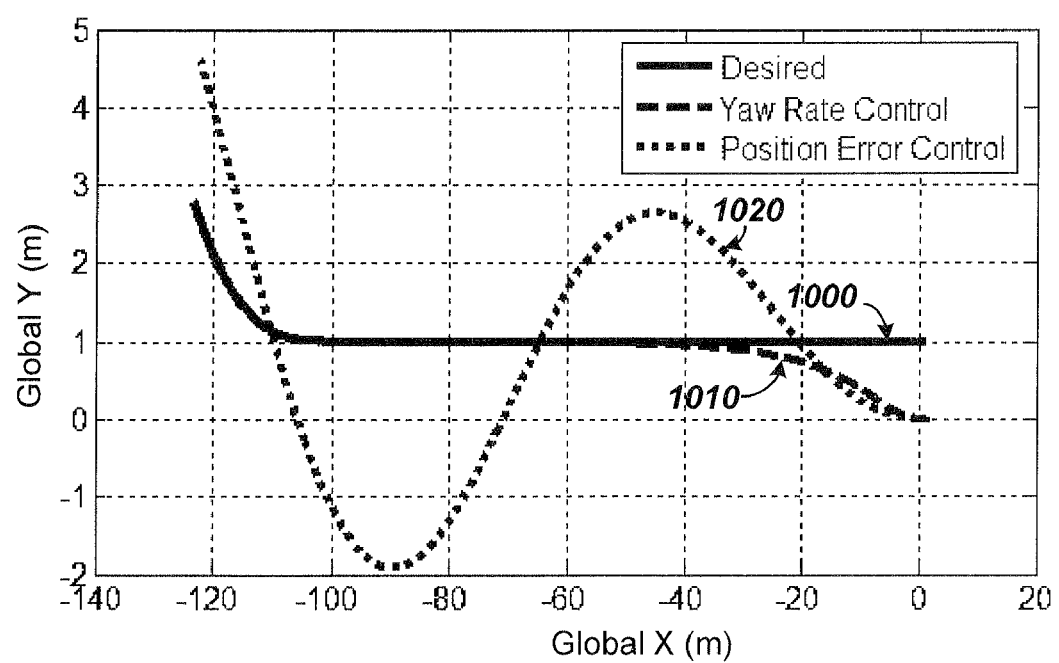
FIG. 10 shows plots of simulation data for a desired trajectory with a one meter initial offset in terms of global positions X and Y, the path of a trajectory tracking control system consistent with the present disclosure and the path of a trajectory tracking control system that uses position error, for comparison.

FIG. 10 depicts plots of a desired trajectory 1000, a simulated vehicle path 1010 for yaw rate control (i.e., implementing a yaw rate generator, consistent with the present disclosure) and a simulated vehicle path 1020 for position error control. In this example, the simulation starts with each vehicle at a lateral offset of about 1 meter at longitudinal position X=0. The vehicle path 1010 for yaw rate control appears to achieve the desired trajectory 1000 by about longitudinal position X=−40 m. The vehicle path 1020 for position error control appears to oscillate about the desired trajectory 1000.

Figure 11:
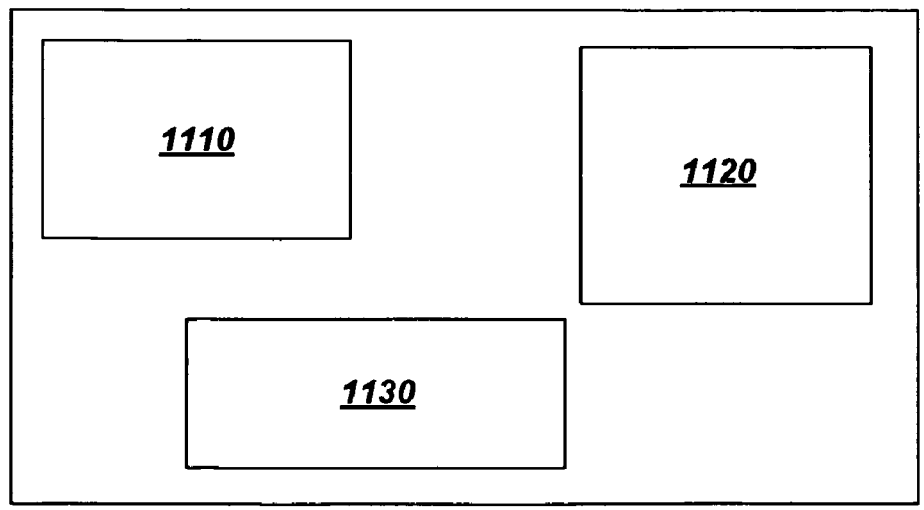
FIG. 11 illustrates an example of an autonomous ground vehicle control system for relatively high-speed operation that contains a processor, machine readable media and a user interface.

It should also be appreciated that the functionality described herein for the embodiments of the present invention may be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 11, a control system for operating an autonomous ground vehicle at relatively high speeds may contain a processor (1110) and machine readable media (1120) and user interface (1130).

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A reference yaw rate generator for an autonomous ground vehicle control system wherein said reference yaw rate generator is configured to generate a reference yaw rate ($r_r$) based on an actual latitudinal position (Y), a desired latitudinal position ($Y_d$), an actual longitudinal position (X), a desired longitudinal position ($X_d$) and an actual heading ($\psi$) of said autonomous ground vehicle; and a yaw rate tracking controller configured to receive said reference yaw rate and configured to adjust a steering mechanism based on said reference yaw rate, wherein said reference yaw rate depends on vehicle dynamics, is independent of a mechanism used to steer said autonomous ground vehicle and permits said autonomous ground vehicle to track a trajectory while maintaining autonomous ground vehicle stability, and wherein said yaw rate tracking controller is configured to adjust an autonomous ground vehicle yaw rate to minimize a difference between said reference yaw rate and said autonomous ground vehicle yaw rate.

2. The reference yaw rate generator of claim 1 wherein said reference yaw rate changes with time and is further based upon a derivative with respect to time of said desired latitudinal position ($\dot{Y}_d$) and a derivative with respect to time of said desired longitudinal position ($\dot{X}_d$).

3. The reference yaw rate generator of claim 2, where said reference yaw rate generator determines an intermediate yaw angle ($\psi_{rO}$) wherein said intermediate yaw angle is determined by the following relationship $$\psi_{r0} = a\tan\left(\frac{\dot{Y}_d + \lambda_1 Y_e}{\dot{X}_d + \lambda_1 X_e}\right)$$

wherein $\lambda_1$ is a control gain, $Y_e$ is a difference between said desired and actual latitudinal positions and $X_e$ is a difference between said desired and actual longitudinal positions.

4. The reference yaw rate generator of claim 1 wherein said reference yaw rate is further based upon a weighted lateral position error ($ky_e$) for said autonomous ground vehicle.

5. The reference yaw rate generator of claim 4 wherein said reference yaw rate is further based on an intermediate desired reference yaw rate ($\dot{\psi}_r$).

6. The reference yaw rate generator of claim 5 wherein said reference yaw rate is further based upon a difference between a reference heading ($\psi_r$) and said actual heading ($\psi$).

7. An autonomous ground vehicle control system for a vehicle having a steering mechanism, comprising:
a reference yaw rate generator for said autonomous ground vehicle control system wherein said reference yaw rate generator is configured to generate a reference yaw rate based on an actual latitudinal position, a desired latitudinal position, an actual longitudinal position (X) and desired longitudinal position ($X_d$) and an actual heading of said autonomous ground vehicle; and
a yaw rate tracking controller configured to receive said reference yaw rate and configured to adjust a steering mechanism based on said reference yaw rate, wherein said reference yaw rate depends on vehicle dynamics, is independent of a mechanism used to steer said autonomous ground vehicle and permits said autonomous ground vehicle to track a trajectory while maintaining autonomous ground vehicle stability, and wherein said yaw rate tracking controller is configured to adjust an autonomous ground vehicle yaw rate to minimize a difference between said reference yaw rate and said autonomous ground vehicle yaw rate.

8. The reference yaw rate generator of claim 7 wherein said reference yaw rate changes with time and is further based upon a derivative with respect to time of said desired latitudinal position ($\dot{Y}_d$) and a derivative with respect to time of said desired longitudinal position ($\dot{X}_d$).

9. The reference yaw rate generator of claim 8, where said reference yaw rate generator determines an intermediate yaw angle ($\psi_{rO}$) wherein said intermediate yaw angle is determined by the following relationship $$\psi_{r0} = a\tan\left(\frac{\dot{Y}_d + \lambda_1 Y_e}{\dot{X}_d + \lambda_1 X_e}\right)$$

wherein $\lambda_1$ is a control gain, $Y_e$ is a difference between said desired and actual latitudinal position and $X_e$ is a difference between said desired and actual longitudinal position.

10. The reference yaw rate generator of claim 7 wherein said reference yaw rate is further based upon a weighted lateral position error ($ky_e$) for said autonomous ground vehicle.

11. The reference yaw rate generator of claim 10 wherein said reference yaw rate is further based on an intermediate desired reference yaw rate ($\dot{\psi}_r$).

12. The reference yaw rate generator of claim 11 wherein said reference yaw rate is further based upon a difference between a reference heading ($\psi_r$) and said actual heading ($\psi$).

13. A method for steering an autonomous ground vehicle comprising:
providing an actual latitudinal position (Y), a desired latitudinal position ($Y_d$), an actual longitudinal position (X), desired longitudinal position ($X_d$) and an actual heading ($\psi$) of said autonomous ground vehicle to a reference yaw rate generator; and
generating a reference yaw rate ($r_1$) by said reference yaw rate generator based on said actual latitudinal position (Y), said desired latitudinal position ($Y_d$), said actual longitudinal position (X), said desired longitudinal position ($X_d$) and said actual heading ($\psi$) of said autonomous ground vehicle; and
providing said reference yaw rate to a yaw rate tracking controller, wherein said reference yaw rate depends on vehicle dynamics, is independent of a mechanism used to steer said autonomous ground vehicle and permits said autonomous ground vehicle to track a trajectory while maintaining autonomous ground vehicle stability, and wherein said yaw rate tracking controller is configured to adjust an autonomous ground vehicle yaw rate to minimize a difference between said reference yaw rate and said autonomous ground vehicle yaw rate.

14. The method of claim 13 further comprising:
determining a derivative with respect to time of said desired latitudinal position ($\dot{Y}_d$) and a derivative with respect to time of said desired longitudinal position ($\dot{X}_d$) and generating said reference yaw rate based upon said derivatives.

15. The method of claim 14 further comprising determining an intermediate yaw angle ($\psi_{rO}$) wherein said intermediate yaw angle is determined by the following relationship $$\psi_{r0} = a\tan\left(\frac{\dot{Y}_d + \lambda_1 Y_e}{\dot{X}_d + \lambda_1 X_e}\right)$$

wherein $\lambda_1$ is a control gain, $Y_e$ is a difference between said desired and actual latitudinal positions and $X_e$ is a difference between said desired and actual longitudinal positions and generating said reference yaw rate based upon said intermediate yaw angle.

16. The method of claim 13 further comprising:
determining a weighted lateral position error ($ky_e$) for said autonomous ground vehicle; and
generating said reference yaw rate based upon said weighted lateral position error.

17. The method of claim 16 further comprising:
determining an intermediate desired reference yaw rate ($\dot{\psi}_r$); and
generating said reference yaw rate based upon said intermediate desired reference yaw rate.

18. The method of claim 17 further comprising:
determining a difference between a reference heading ($\psi_r$) and said actual heading ($\psi$); and
generating said reference yaw rate based upon said difference between said reference heading and said actual heading.

19. An article comprising a storage medium having stored thereon instructions that when executed by a machine result in the following operations for an autonomous ground vehicle:
generating a reference yaw rate ($r_r$) based on an actual latitudinal position (Y), a desired latitudinal position ($Y_d$), an actual longitudinal position (X), a desired longitudinal position ($X_d$) and an actual heading ($\psi$) of said autonomous ground vehicle to a reference yaw rate generator; and
providing said reference yaw rate to a yaw rate tracking controller, wherein said reference yaw rate depends on vehicle dynamics, is independent of a mechanism used to steer said autonomous ground vehicle and permits said autonomous ground vehicle to track a trajectory while maintaining autonomous ground vehicle stability, and wherein said yaw rate tracking controller is configured to adjust an autonomous ground vehicle yaw rate to minimize a difference between said reference yaw rate and said autonomous ground vehicle yaw rate.

* * * * *